Figure 1:
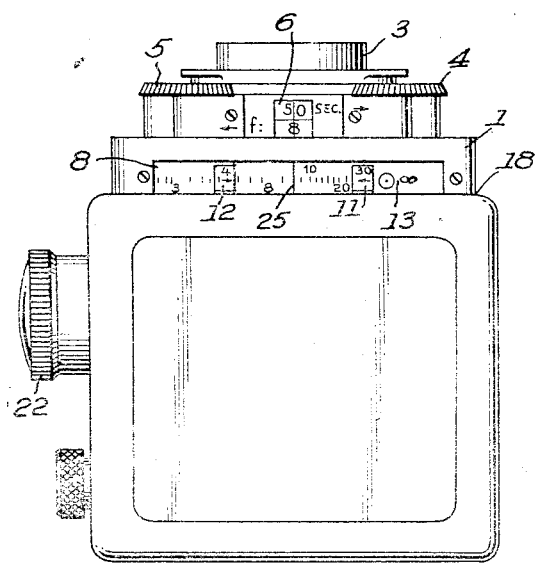

Inventor:
WILHELM PRIESEMANN
By [signature]
Attorney.

UNITED STATES PATENT OFFICE 2,342,819

PHOTOGRAPHIC CAMERA

Wilhelm Priesemann, Brunswick, Germany; vested in the Alien Property Custodian

Application May 19, 1941, Serial No. 394,217
In Germany April 16, 1940

7 Claims. (Cl. 95—44)

My invention relates to photographic cameras which are provided with a device that permits of reading off the depth of focus of the lens when making an exposure.

It is a familiar fact that pictures taken by means of a photographic camera show sharp definition not only of the object itself upon which the camera was focused, but of other objects also lying within a space between a point a certain distance in front of the object actually depicted and a point a certain distance behind it, the distance between nearest and farthest sharp planes being called "depth of focus." Depth of focus varies in the same camera according to the aperture of the lens, becoming greater in inverse proportion to the size of the lens aperture or the diaphragm aperture, and it further naturally depends on the distance at which the camera happens to be focused.

The subject matter of my present invention is a camera with a depth-of-focus indicator comprising a movable distance scale and two pointers that move over the said scale. The latter is coupled directly to the lens focusing device of the camera, while the two pointers are actuated in opposite directions by the diaphragm adjusting device of the lens.

The subject matter of my invention further covers the design of the two pointers as two-arm levers with a fixed pivot, the short arms of the said pointers engaging with the device for the adjustment of the diaphragm. For that purpose the diaphragm adjusting ring is provided with cams or slotted links that act on the ends of the levers. That design of the indicating device makes it possible to attain the desired movement of the two pointers depending on the diaphragm adjustment along the range scale in a simple way and without the use of special transmission gearing, which would occupy a relatively large space.

A further feature of my invention is the design of the distance scale itself as a movable flexible band coupled to the focusing device, an arrangement which has the advantage that the scale can readily be accommodated even in a camera of small dimensions, whereby it is simply bent to suit the space at disposal, or is designed so that it can be wound on a spool. A specially advantageous method is to attach the two ends of the scale band to rollers or the like. upon which the said band can be alternately wound, whereby at least one of these two rollers is coupled to the lens focusing device and is actuated simultaneously with it. That section of the scale which happens not to be used, in accordance with the distance focused, is thereby wound on one of the rollers. The scale is preferably graduated in metres and centimetres and is moved past a fixed mark, so that the distance focused can be read directly, while the depth-of-focus is indicated by means of the said two pointers coupled to the diaphragm which move in opposite directions over the scale, whereby the depth of focus indicated is always the distance lying between the two said pointers.

My invention can be advantageously applied to all photographic cameras with focusing lens, and also to folding cameras. It is of importance for box cameras, in particular for two-lens reflex cameras, fitted with a joint lens board capable of movement in relation to the camera body. The depth-of-focus indicator the subject matter of the present invention is so thin that it can be disposed directly on the lens mount itself. That arrangement makes it possible simply to couple the lens diaphragm ring and the said pointers of the device, while it has been found, on the other hand, that the construction of the requisite coupling capable of being pulled out between the scale drive and the lens focusing, which is mostly disposed on the camera body, causes no difficulty.

In order to ensure that the depth-of-focus indicating device on the camera can be easily read from above, my invention further provides for an arrangement by which the two pointers coupled to the diaphragm move in, or practically in the plane of the diaphragm ring, while the scale band lies in a plane vertical, or approximately vertical thereto. The ends of the two said pointers are then preferably bent at right angles, so as to project over the scale band. It is advantageous to dispose a peep-window with an indicator on the top of the camera body, or on the front part of the camera, through which the scale and pointers can be viewed from above.

Figure 2:
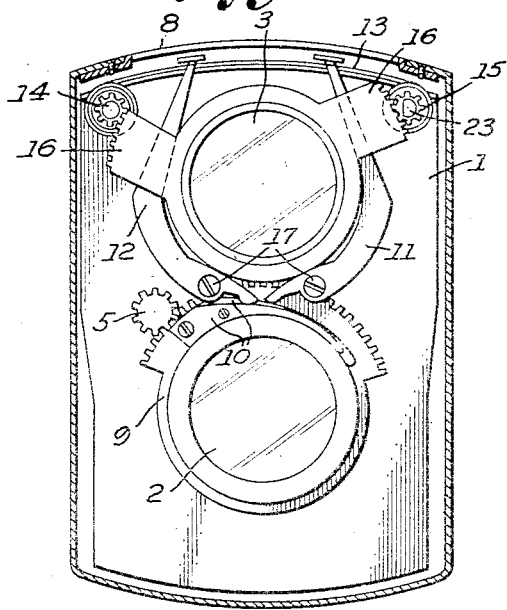
Figure 3:
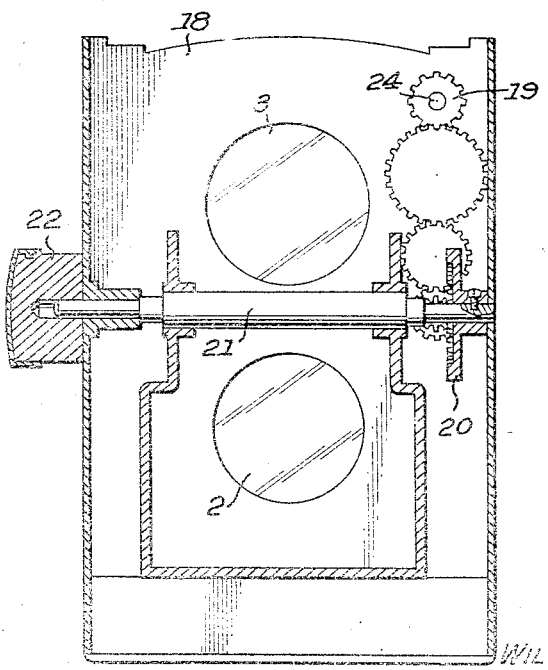

The accompanying drawing, Figs. 1, 2, and 3, exemplify and explain a way in which my present invention may be carried into practical effect, the example relating to a photographic camera with an adjustable finder chamber disposed above the taking chamber (a twin-lens reflex camera with adjustable focusing screen), but my invention is not confined to this camera.

Fig. 1 is a plan view of the camera from above with closed light hood. Fig. 2 represents a rear view of the lens mount by itself, which can be adjusted in relation to the camera body and in the present example carries the main part of the depth-of-focus indicator the subject-matter of my present invention. Fig. 3 shows a partial elevation of the lens board looking towards the side thereof opposite to that illustrated in Fig. 2.

The lens board 1 (Figs. 1 and 2) can be adjusted in relation to the camera. It carries the taking lens 2 and and the finder lens 3 disposed above it. The mill-edged wheels 4 and 5 serve for the adjustment of the shutter speed and the lens diaphragm. These two adjustments are preferably arranged in any familiar way, so that they can be read from above, in a window 6 disposed in the front part of the camera body. Another window 8 serves the purpose of making visible the depth-of-focus indicator the subject-matter of the present invention. It consists mainly of the band-shaped movable range scale 13 and the two pointers 11 and 12 (Fig. 2) which move over the said scale. These pointers, the position of which depends on the adjustment of the diaphragm of the lens 2, are actuated according to my invention by the diaphragm ring 9, for which purpose, according to the present example, two cams 10 are attached one on top of the other to the diaphragm ring. In many cases, however, a single cam will be found to be sufficient.

The said pointers themselves are pivoted at 17 and the tips of their short lever arms are brought into contact with the cams 10 by means of springs not represented in the drawing. The long arms of the two said pointers embrace the finder lens 3, as shown in Fig. 2, and their tips are bent at right angles, so that they are able to pass over the band scale 13, which lies vertically to the plane of movement of the said two pointers. As shown in the drawing, the tips of the said pointers are preferably designed as transparent marks with arrows engraved thereon.

The scale band may consist of a texture or, preferably, of thin steel strip. Its two ends, according to the present example, are attached to the rollers 14 and 15, upon which it can be alternately wound. These rollers are mounted on the lens board and coupled together by means of two toothed segments 16 mounted centrically in relation to the finder lens, about which they can be rotated, whereby, when the band is wound, for example, on roller 15, a corresponding length is unwound from roller 14, and vice versa.

The band is driven by the knob 22 for actuating the lens focusing device disposed on the camera body. For that purpose the roller 15 is provided with an edged pin 23 (Fig. 2) projecting through the front wall 18 into the interior of the camera body, whereby the said pin engages with a corresponding central notch 24 of the toothed wheel 19 rotatably mounted on the back of the said wall 18 (Fig. 3). The pin 23 is capable of axial movement in the said notch, so that it always remains coupled with the toothed wheel 19 upon adjustment of the lens mount 1, i. e., therefore, when focusing sharply. Through the medium of another toothed gearing, the said toothed wheel 19 in turn is connected with the crown wheel 20 disposed on the shaft 21, which actuates the lens focusing, preferably by means of cams. The scale 13, which is preferably graduated in metres, is therefore simultaneously moved upon actuating the lens focusing knob 22. The distance focused can then be read off directly from above in the window 8 (Fig. 1) with the aid of a mark 25. In the present example (Fig. 1) a range of 9 metres has just been focused.

The distance on the scale enclosed between the two said pointers 11 and 12 represents the depth of field focused. Upon actuating the diaphragm adjustment knob 5, the two said opposed-motion pointers move towards one another, the greater the diaphragm aperture, because depth of focus, as is well known, reaches its minimum when the aperture of the diaphragm is great. In Fig. 2 the said pointers indicate a depth-of-focus range of from about 4 metres to about 25 metres with a diaphragm of 1:8, as shown in the window 6, and a focused distance of 8 metres is similarly shown in window 8.

Now what I claim is:

1. A photographic camera containing a lens capable of being focused, an adjustable diaphragm adapted for altering the clear aperture of the lens, a diaphragm adjusting ring, a device for indicating the distance focused and the depth of focus of the lens corresponding to the diaphragm aperture, said indicating device consisting of a movable distance scale coupled to the lens focusing device and two pointers moving over the said scale, the pointers comprising two-arm levers, and cams provided on the diaphragm adjusting ring, the short arms of the two two-arm levers engaging with the said cams, which latter are adapted to induce opposed movement of the two said pointers over the distance scale upon adjusting the diaphragm.

2. A photographic camera containing a lens capable of being focused, an adjustable lens diaphragm, a diaphragm adjusting ring a device for indicating the depth of focus of the lens corresponding to the respective focusing and also to the respective diaphragm aperture, said indicating device consisting of a movable distance scale coupled to the lens focusing device and two pointers coupled to the diaphragm adjustment, the distance scale consisting of a band, suitable rollers provided for actuating the said scale band, at least one of these rollers being coupled to and driven by the lens focusing device, the two said pointers being two-arm levers with arms of unequal length, and cams provided on the diaphragm adjusting ring of the lens, the short arms of the two said pointers being in bearing with the cams and the same being adapted to move these pointers in opposite directions over the distance scale when adjusting the diaphragm.

3. A photographic camera according to claim 2, wherein the said scale band has its two ends attached to rollers, and the drive of these rollers is adapted to wind the said band from one of them onto the other upon rotation in one direction, and vice versa.

4. In a rigid photographic box camera with a lens board carrying a taking lens with an adjustable diaphragm, the combination of a focusing device provided on the camera for moving the lens mount relatively to the camera body, and a handle located on the camera body for actuating the focusing device, with a distance scale consisting of a scale band disposed on the lens board and two rollers, the said band being wound from one of these two rollers onto the other and vice versa, the said rollers being driven by the device for focusing the lens board, an adjusting ring for the lens diaphragm, and two pointers provided on the lens board and being in the form of two-arm levers, the two arms of each pointer being of unequal length, cams provided on the adjusting ring of the lens diaphragm with which the short arms of the two said pointers engage, the cams being adapted to move the pointers over the distance scale towards one another upon rotating the diaphragm in the sense of opening the lens and to move the two pointers away from one another upon adjusting the diaphragm in the sense of closing the lens.

5. A rigid photographic box camera with a lens board carrying a taking lens fitted with an adjustable diaphragm, an adjusting ring for the lens diaphragm, the camera being provided with an adjusting device for moving the lens board relatively to the camera body, and a device for indicating the depth of focus of the lens corresponding to the respective focusing and also to the respective diaphragm aperture, the said indicating device consisting of a movable distance scale coupled to the lens focusing device and two pointers coupled to the diaphragm adjustment, a handle on the camera body for actuating the focusing device, the distance scale consisting of a band disposed on the lens board, and two rollers, the band being wound from one of the said rollers on the other and vice versa, the plane of the said scale band being substantially perpendicular to the plane of the lens board and the scale itself being adapted to be read by looking down on the camera from above, the shafts of the two said driving rollers lying in a plane substantially parallel to the plane of said scale band, one of the said shafts being a hollow shaft, a further shaft on the camera body which is driven by the focusing device of the camera, which said shaft engages with the hollow shaft of the one roller to drive it, the length of the driving shaft being so dimensioned that the roller remains in engagement with it in every position of the lens board, the said two pointers being two-arm levers, the two arms of each pointer being of unequal length, cams provided on the adjusting ring of the lens diaphragm with which the shorter arms of the said pointers engage.

6. A photographic camera according to claim 5, wherein the ends of the longer arms of the two said pointers are bent at right angles and project over the distance scale band.

7. A photographic camera with adjustable finder chamber located above the taking chamber, the camera having a rigid body and a lens board adjustable relatively to the camera body, the taking lens being fitted with an adjustable diaphragm, an adjusting ring for the diaphragm, a depth-of-focus indicator attached to the lens board, the said indicator consisting of a distance scale band movable above the finder lens and capable of being read from above, a roller provided at each end of the said band upon which the band can be alternately wound, each said roller being rigidly connected with a toothed wheel, whereby the rollers are coupled together through the medium of their toothed wheels by a ring capable of being rotated about the finder lens and fitted with toothed segments, each of which latter engages with one of the two toothed wheels rigidly connected with the said rollers, a driving shaft rigidly disposed on the camera body and coupled to the focusing device of the camera, the said driving shaft being coupled to one of the two said band rollers on the lens board and the length of which is so dimensioned that the roller on it can slide only axially and thereby remains coupled to it in every position of the lens mount, two pointers moving in opposite directions cooperating with the distance scale, the said pointers being two-arm levers with arms of unequal length, the pivots of the two levers being disposed between the finder lens and the taking lens, the diaphragm adjusting ring of the taking lens being fitted with cams which engage with the short arms of the two said pointers, while the long arms of these pointers embrace the finder lens of the camera.

WILHELM PRIESEMANN.